United States Patent [19]
Kubo et al.

[11] Patent Number: 6,124,919
[45] Date of Patent: Sep. 26, 2000

[54] HALF REFLECTION TYPE LIQUID CRYSTAL DISPLAY DEVICE HAVING MATCHED PHASE OF TRANSMITTED AND REFLECTED LIGHT

[75] Inventors: Kiichiro Kubo, Mobara; Yoshikuni Nagashima, Isumi-machi; Masaru Suzuki; Terunori Saito, both of Mobara, all of Japan

[73] Assignee: Hitachi, Ltd., Tokyo, Japan

[21] Appl. No.: 09/432,399

[22] Filed: Nov. 2, 1999

[30] Foreign Application Priority Data

Nov. 2, 1998 [JP] Japan .................................. 10-312109

[51] Int. Cl.⁷ ................................................ G02F 1/1333
[52] U.S. Cl. ........................ 349/162; 349/113; 349/117; 349/169
[58] Field of Search .................................... 349/162, 117, 349/169, 113

[56] References Cited

U.S. PATENT DOCUMENTS 5,250,214  10/1993  Kanemoto et al. ................. 252/299.01
5,751,382   5/1998  Yamada et al. ........................ 349/12
5,841,494  11/1998  Hall ..................................... 349/98
5,995,180  11/1999  Moriwaki et al. ..................... 349/96
6,008,871  12/1999  Okumura ............................. 349/61

*Primary Examiner*—Kenneth Parker
*Assistant Examiner*—Mike Qi
*Attorney, Agent, or Firm*—Antonelli, Terry, Stout & Kraus, LLP

[57] ABSTRACT

A liquid crystal display device is constructed such that a liquid crystal layer is sandwiched between an upper substrate, which is provided with upper transparent electrodes for forming pixels, and a lower substrate, which is provided with lower transparent electrodes disposed so as to intersect with the upper transparent electrodes. The liquid crystal panel includes a half reflection layer having a reflection function and a transmission function which is formed on the inner surface of the lower substrate as a lower layer of the lower transparent electrodes; an upper retardation film, an upper polarizing plate, and a light diffusing plate which are laminated on the upper substrate; and a lower retardation film and a lower polarizing plate, which are laminated on the surface of the lower substrate. Due to such a construction, the half reflection type liquid crystal display device is capable of providing an image display of high brightness and high contrast.

12 Claims, 5 Drawing Sheets

HALF REFLECTION TYPE LIQUID CRYSTAL DISPLAY DEVICE HAVING MATCHED PHASE OF TRANSMITTED AND REFLECTED LIGHT

BACKGROUND OF THE INVENTION

1. Field of the Invention

This invention relates to a liquid crystal panel which is capable of displaying a high quality image in both modes consisting of a reflection mode which uses outdoor daytime light as an illumination lighting source and a transmission mode which uses a backlight incorporated in the panel as an illumination lighting source, and a liquid crystal display device which uses this liquid crystal panel.

2. Description of the Related Art

A liquid crystal display device which is used as display means of a personal computer or a monitor of other devices is a device which irradiates an illumination light to an image formed on a liquid crystal panel and emits a transmitted light or a reflected light to the display surface side so as to visualize the image.

That is, this type of liquid crystal display device, generally, uses a liquid crystal panel which sandwiches a liquid crystal layer in a space defined by adhering a pair of substrates having pixel selecting electrodes and the like, and forms an image by changing the orientation direction of liquid crystal molecules of selected pixel portions. The formed image per se is not in a visible condition so that the liquid crystal display device is constructed such that light is given from the outside and is irradiated to the liquid crystal panel and the transmitted light or the reflected light is observed.

This type of liquid crystal panel is classified into a transmission mode which uses a light source mounted behind the liquid crystal panel, or a so-called backlight and a reflection mode which uses outdoor daytime light which is present in the surroundings of the liquid crystal panel.

Furthermore, its power source capacity is limited. For example, with respect to PDA (small-sized portable data terminals), since their respective power sources per se mounted thereon are small, most of these terminals have a reflection display mode function which takes in surrounding light as an illumination light while excluding an active light source of the liquid crystal panel such as a backlight as an illumination lighting source. However, to assure the use of the liquid crystal panel in an atmosphere where the surrounding light is small or there is no outdoor daytime light at all, several liquid crystal display devices which are provided with auxiliary light sources have been manufactured to assure the use of the liquid crystal panel even in a dark environment.

This transmission and reflection type liquid crystal panel (half reflection type liquid crystal panel) which can be used in both the reflection mode and the transmission mode is provided with a half reflection plate on an outside surface of a substrate (lower substrate) opposed to a display surface side substrate (upper substrate). In such a liquid crystal panel, the outdoor daytime light which enters through the observation side substrate as an incident light is reflected and thereafter is emitted from the upper substrate so as to visualize an image, and the light irradiated from the backlight disposed behind the liquid crystal panel is transmitted through the lower and upper substrates and is emitted from the upper substrate so as to visualize the image.

FIG. 6 shows a cross sectional view schematically explaining the construction of the conventional half reflection type liquid crystal panel. The panel is constructed such that a liquid crystal layer 7 is interposed between a lower substrate 1 made of a glass plate or the like which is provided with a lower transparent electrode 4 on an inner surface thereof and an upper substrate 5 made of a glass plate or the like which is provided with a lower transparent electrode 6 on an inner surface thereof, the periphery of the liquid crystal layer 7 is sealed by a seal member 8, a lower polarizing plate 9 and a half reflecting plate 2' are laminated on the surface of the lower substrate 1, and a retardation film 10, an upper polarizing plate 11 and a light diffusing plate 15 are laminated on the surface of the upper substrate 5.

Although FIG. 6 shows a liquid crystal panel for a monochromatic display, the panel can be converted to the one for a color display by merely providing three color filters to the inner surface of the upper substrate or the lower substrate.

The upper polarizing plate 11 and the lower polarizing plate 9 which are disposed at the upper and lower portions of the liquid crystal panel have a function to emit the modulated light which transmits through the liquid crystal layer 7, that is, the light which has its orientation direction controlled at selected pixels toward the display surface side. The retardation film 10 corrects a thickness of respective substrates and the liquid crystal layer of the liquid crystal panel and Δnd (retardation) of other constitutional members. Furthermore, the light diffusing plate 15 prevents lowering of the brightness by scattering light emitted from the liquid crystal panel while preventing the reflection of the outdoor daytime light.

With the type of the liquid crystal panel shown in FIG. 6, in the reflection mode which uses the outdoor daytime light as the illumination light, the light entered from the upper substrate 5 side which defines the display surface side is transmitted through the lower substrate 1 and is reflected by the half reflection plate 2' and again is transmitted through the lower substrate 1 and the upper substrate 5 and is emitted toward the display surface side.

On the other hand, in the transmission mode which uses the backlight as the illumination light, the light irradiated by the backlight (not shown in the drawing) disposed at the rear side of the liquid crystal panel, that is, on the rear surface of the half reflection plate 2' is transmitted through the half reflection plate 2', the lower substrate 1 and the upper substrate 5 and is emitted toward the display surface side.

In case there is the outdoor daytime light but its level of brightness is low, the display is performed using the transmission-and-reflection mode where the backlight is turned on so that the reflection mode and the transmission mode are both used.

Furthermore, in the PDA and the like, there is a type which is provided with a so-called touch panel (not shown in drawings) for directly inputting data or the like from the display surface using a pen, a finger or the like. Such a touch panel is laminated above the upper substrate of the liquid crystal panel and upon pressing the touch panel with a nib, given information is directly inputted from a screen, is displayed on the liquid crystal panel, is stored in memory means incorporated in the touch panel, and is used for the reproduction.

With respect to the above-mentioned conventional liquid crystal display device, however, in the reflection mode, for example, the outdoor daytime light reaches the half reflection plate after passing through the upper substrate and the lower substrate and the light reflected by this half reflection plate again passes through the lower substrate and the upper substrate and is emitted toward the display surface side as the outgoing light and hence, the utilization efficiency of the outdoor daytime light used as the outgoing light is low so that there arises a problem that it is difficult to enhance the brightness of the display screen.

Furthermore, in the transmission mode, the light irradiated from the backlight suffers from a considerable loss at the half reflection plate so that it is difficult to obtain the sufficient brightness and the enhancement of the contrast is also limited.

Still furthermore, in the transmission mode, there has been a problem that the sufficient brightness is not obtained when the phase difference exists between the phase of the reflected light of the outdoor daytime light emitted after being reflected by the half reflection plate and the phase of the transmitted light which is emitted after passing through the half reflection plate. Furthermore, with respect to the color display, in the reflection mode particularly, there exist problems such that the light advances through the lower substrate and then returns through the lower substrate so that the deterioration of chroma occurs and the color mixture occurs due to parallax.

Accordingly, it is an object of the present invention to provide a half reflection type liquid crystal panel capable of displaying the image having high brightness and high contrast and a liquid crystal display device using such a liquid crystal panel.

SUMMARY OF THE INVENTION

The above-mentioned object can be achieved by mounting a half reflection film having high reflecting efficiency in the inside of a liquid crystal panel in such a manner that in the reflection mode, the incident outdoor daytime light does not receive the influence of light absorption by a lower substrate and in the transmission mode, the phase of the transmitted light passing through the half reflection film substantially agrees with the phase of the reflected outdoor daytime light and hence, the brightness of both lights is amplified so that the image display of high brightness and high contrast can be obtained.

That is, the present invention is characterized by having constructions described in following (1) to (5).

(1) In the liquid crystal panel, a liquid crystal layer is sandwiched between an upper substrate which is provided with upper transparent electrodes for forming pixels and a lower substrate which is provided with lower transparent electrodes such that they intersect the upper transparent electrodes. The liquid crystal panel includes a half reflection layer having a reflection function and a transmission function which is formed on the inner surface of the lower substrate as a lower layer of the under transparent electrodes, an upper retardation film, an upper polarizing plate and a light diffusing plate which are laminated on the upper substrate, and a lower retardation film and a lower polarizing plate which are laminated on the surface of the lower substrate.

Due to such a construction, in the reflection display mode as well as in the transmission display mode, the brightness can be enhanced and the image display having high contrast can be obtained.

Furthermore, the transmission factor or the transmittivity of the half reflection layer is made uniform within a display range of the liquid crystal panel, no irregularities of brightness occurs on the displayed image.

(2) With respect to the construction of the feature (1), a color filter layer made of a plurality of colors is formed on the inner surface of the upper substrate as a lower layer of the upper transparent electrodes and a passivation film is formed between this color filter layer and the upper transparent electrodes.

Due to such a construction, in the reflection display mode as well as in the transmission display mode, the brightness of the color image can be enhanced so that the image display having high contrast can be obtained.

(3) With respect to the construction of the feature (1) or (2), the phase of the reflected light at the half reflection layer and the phase of the transmitted light which passes through the half reflection layer from the lower substrate side substantially agree with each other.

Due to such a construction, lowering of brightness and color mixing as a vision of an observer are suppressed so that in the reflection display mode as well as in the transmission display mode, brightness of the color image is enhanced so that image display having high contrast can be obtained.

To be more specific, by setting the phase difference between the phase of the transmitted light which passes through the half reflection layer and the phase of the reflection light on the half reflection layer within $\pm \pi/4$ (within $\pm 45°$), the difference of display between the reflection display mode and the transmission display mode can be minimized.

(4) With respect to the construction of the feature (1) or (2), a back lighting device is disposed at the rear side of the liquid crystal panel so as to provide a back lighting type liquid crystal display device.

The back lighting device, that is, the backlight is lit in an environment with a little outdoor daytime light and mainly performs the image display in the transmission mode thus enabling the image display of high brightness and high contrast.

(5) With respect to the construction of the feature (4), a touch panel is disposed on the surface side of the liquid crystal panel so that information can be inputted by way of the screen.

Due to such a construction, with the provision of the touch panel, information can be directly inputted by way of the screen thus increasing the availability of the small-sized portable information terminal.

The present invention is applicable to other types of liquid crystal panel such as an active matrix type liquid crystal panel adopting a thin film transistor system or the like. Furthermore, the present invention is not limited to the above mentioned constructions and various modifications thereof are considered without departing from the technical spirit of the present invention.

DESCRIPTION OF THE PREFERREED EMBODIMENTS

The best mode for contemplating the present invention is explained in conjunction with embodiments hereinafter.

Figure 1:
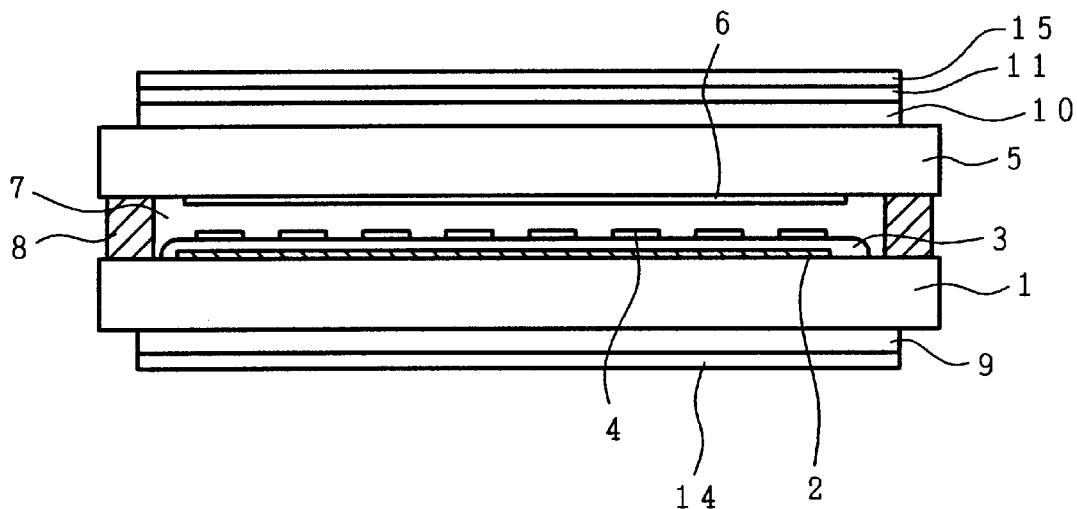
FIG. 1 is a cross sectional view explaining the first embodiment of the liquid crystal panel according to the present invention.

FIG. 1 is a cross sectional view for explaining the first embodiment of a liquid crystal panel of the present invention. In the drawing, numeral 1 indicates a lower glass substrate which constitutes a lower substrate, numeral 2 indicates a half reflection layer, numeral 3 indicates a passivation film, numeral 4 indicates a lower transparent electrode which constitutes a lower electrode, numeral 5 indicates an upper glass substrate which constitutes an upper substrate, numeral 6 indicates upper transparent electrodes which constitutes upper electrodes, numeral 7 indicates a liquid crystal layer made of liquid crystal composition, and numeral 8 indicates a seal member made of epoxy resin or the like which adheres the upper substrate and the lower substrate after filling the liquid crystal layer between the upper substrate and the lower substrate and secures them to form the liquid crystal panel.

On the surface (upper side) of the upper glass substrate 5 side of the liquid crystal panel, an upper retardation film 10, an upper polarizing plate 11 and a light diffusing plate 15 are laminated. The light diffusing plate 15 may preferably be formed by coating silica fine particles on the surface of the upper polarizing plate 11.

In this embodiment, the half reflection layer 2 is made of an aluminum thin film having a reflectance of 90% which is formed by a vapor deposition method. On the surface of the aluminum thin film having a half reflectivity, a passivation film 3 made of a transparent organic material is formed. The passivation film 3 is an oxidation prevention film made of $SiO_2$ or the like provided for preventing corrosion of aluminum and for flattening of the aluminum thin film.

The material of this reflection layer is not limited to aluminum and any material such as other metallic film or a non-metallic film which has the mirror reflectivity while having half transmission factor can be used. On this passivation film 3, the lower transparent electrodes 4 for driving the liquid crystal panel are mounted.

The degree of polarization and the polarization axis of the upper polarizing plate laminated on the upper surface of the upper glass substrate and $\Delta n \cdot d$ of the upper retardation film are respectively set to optimum values which are determined in view of $\Delta n \cdot d$, the twist angle and the tilt angle of the liquid crystal composition.

Furthermore, on the surface of the lower glass substrate 1, a lower retardation film 9 and a lower polarizing plate 14 are laminated. The degree of polarization and the polarization axis of this lower polarizing plate 14 and $\Delta n \cdot d$ of the lower retardation film 9 are set such that the phase of the light which passes through the lower polarizing plate 14 and the lower retardation film 9 and further passes through the half reflection layer 2 substantially agrees with the phase of the outdoor daytime light which is reflected on the half reflecting layer 2.

To be more specific, the upper retardation film 10 is constructed by two films which are comprised of a first upper retardation film and a second upper retardation film. The angle made by a stretching axis (optical axis) of a second upper retardation film 10 which comes into contact with the second substrate (the upper substrate) 5 and the orientation axis of the upper-substrate-side liquid crystal is set within a range of 70°–120°. The angle made by a stretching axis (optical axis) of the first retardation film (upper retardation film) 10 which comes into contact with the upper polarizing plate 11 side and the orientation axis of the upper-substrate-side liquid crystal layer 7 is set within a range of 90°–160°. The angle made by an absorption axis (optical axis, polarization axis or stretching axis) of the upper polarizing plate 11 and the orientation axis of the upper-substrate-side liquid crystal layer 7 is set within a range of 100°–180°. The angle made by the orientation axis of the upper-substrate-side liquid crystal layer 7 and the orientation axis of lower-substrate-side liquid crystal layer is set to not less than 240°. The retardation $\Delta n \cdot d$ of the liquid crystal layer 7 is set to 0.7 µm–0.95 µm, the retardation $\Delta n \cdot d$ of the second retardation film is set to 130 nm–250 nm, and the retardation $\Delta n \cdot d$ of the first upper retardation film is set to 380 nm–500 nm. Due to such setting of angles and retardations $\Delta n \cdot d$, the display having high contrast is obtained.

Figure 7:
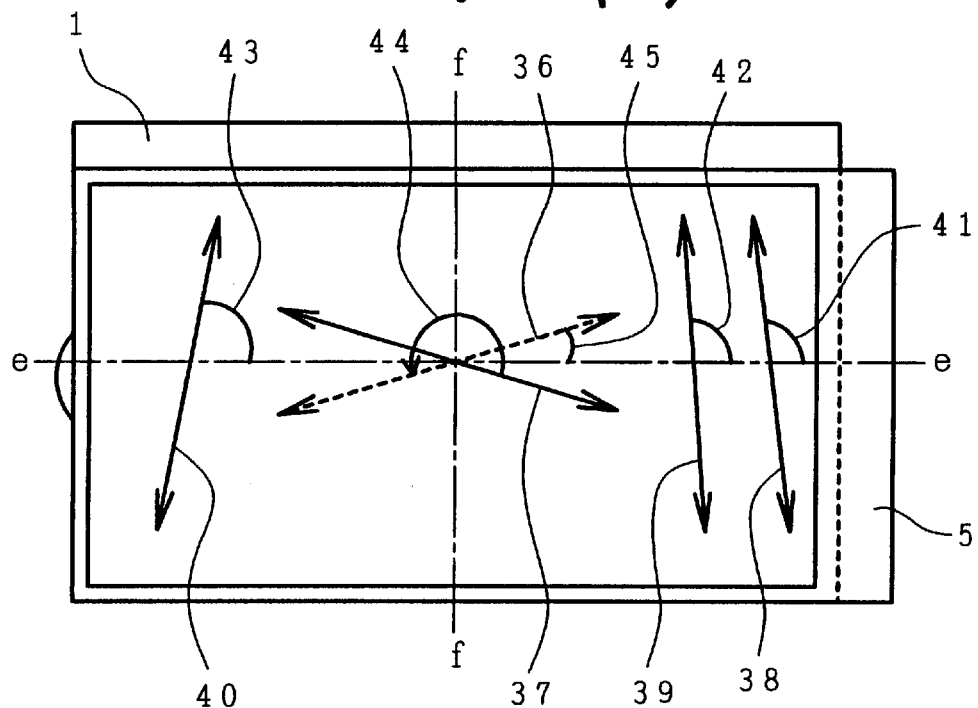
FIG. 7(a) is a plan view of the liquid crystal panel explaining the angular relationship among the absorption axis of an upper polarizing plate, a stretching axis of an upper retardation film and an orientation axis of liquid crystal according to one embodiment of the present invention.
FIG. 7(b) is a plan view of the liquid crystal panel explaining the angular relationship among the absorption axis of a lower polarizing plate, a stretching axis of a lower retardation film and an orientation axis of liquid crystal according to one embodiment of the present invention.
Figure 7:
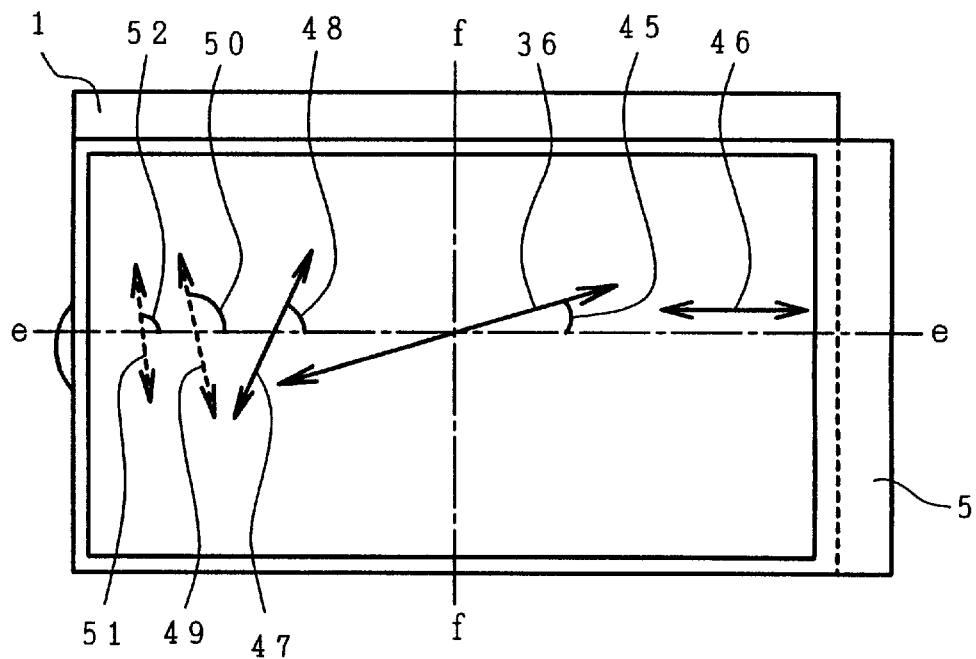

FIG. 7(a) is a plan view of the liquid crystal panel which explains the angular relationship between the absorption axis of the upper polarization plate, the stretching axis of the upper retardation film and the orientation axis of the liquid crystal according to one embodiment of the present invention.

FIG. 7(b) is a plan view of the liquid crystal panel which explains the angular relationship between the absorption axis of the lower polarization plate, the stretching axis of the lower retardation film and the orientation axis of the liquid crystal according to one embodiment of the present invention.

FIG. 7(a) and FIG. 7(b) are explained in view of an example which uses the liquid crystal of STN mode.

In FIG. 7(a) and FIG. 7(b), e—e is a reference line, and to be more specific, is a line parallel to a long side of the second substrate 5 of the liquid crystal display panel and f—f is a line perpendicular to the line e—e. In FIG. 7(a), numeral 37 indicates an upper-substrate-side orientation axis of the liquid crystal layer 7, numeral 36 indicates a lower-substrate-side orientation axis of the liquid crystal layer 7, numeral 38 indicates an absorption axis of the upper polarizing plate 11 (optical axis of the polarizing plate), numeral 39 indicates a stretching axis of the first upper retardation film 10 (optical axis of the first upper retardation film), and numeral 40 indicates a stretching axis of the second upper retardation film 10 (optical axis of the second upper retardation film).

In FIG. 7(a), numeral 41 indicates an angle made by the absorption axis of the polarizing plate 11 and the line c—c and is set to 125±10° to be more specific. Numeral 42 indicates an angle made by the stretching axis 39 of the first upper retardation film 10 and the line e—e and is set to 108±10° to be more specific. Numeral 43 indicates an angle made by the stretching axis 40 of the second upper retardation film 10 and the line e—e and is set to 72±10° to be more specific. Numeral 44 indicates an angle made by the upper-substrate-side orientation axis 37 of the liquid crystal layer 7 and the lower-substrate-side orientation axis 36 (twist angle of liquid crystal display panel) and it is set to not less than 240° with the liquid crystal in STN mode. Numeral 45 indicates an angle made by the upper-substrate-side orientation axis 37 of the liquid crystal layer 7 and the line c—c and is set to (360—twist angle 44)/2)° to be more specific. In TN mode, the twist angle 44 may be set to 90±10°. In case the liquid crystal in STN mode is used, a sufficient contrast can be obtained even when the number of display lines is increased so that the display having high definition can be obtained.

In FIG. 7(b), numeral 46 indicates an absorption axis of the lower polarizing plate 14 (optical axis of the lower polarizing plate) and numeral 47 indicates a stretching axis of the lower retardation film 9 (optical axis of the lower retardation film).

An angle made by the absorption axis of the lower polarizing plate 14 and the line c—c is set to 0±10°. The angle made by the absorption axis of the lower polarizing plate 14 and the line e—e may be set to 90±10°. Numeral 48 indicates an angle made by the stretching axis 47 of the lower retardation film 9 and the line e—e and is set to 45±10° to be more specific.

In this embodiment, as a method for measuring the retardation Δn·d of the upper retardation film 10 and the lower retardation film 9, a spectrum analysis method is used. For example, the retardation film which is an object to be measured is sandwiched between the first and second polarizing films which have their polarizing axes intersept each other. The optical axis of the object to be measured is arranged such that it makes an angle of 45° relative to the polarizing axes of the first and second polarizing films. Then, spectroscopic characteristics of the light which passes through the object to be measured and the first and second polarizing films are measured. In the spectroscopic characteristics of the object to be measured and the first and the second polarizing films, the transmission factor shows the minimum value (valley value) at a specific wavelength λ. Accordingly, by measuring this specific wavelength λ, the retardation Δn·d of the object to be measured can be obtained. In the above embodiment, although the first upper retardation film 10 is measured by using one sheet of first retardation film 10, it is difficult to measure the second upper retardation film 10 in case one sheet of the second upper retardation film 10 is used. Accordingly, in this case, the wavelength λ2 which corresponds to the valley value of the three overlapped second upper retardation films 10 is measured and then the mean value which is obtained by dividing the wavelength λ2 in three is used.

According to the embodiment explained heretofore, no difference takes place in the display characteristics between the reflection display mode and the transmission display mode.

Figure 8:
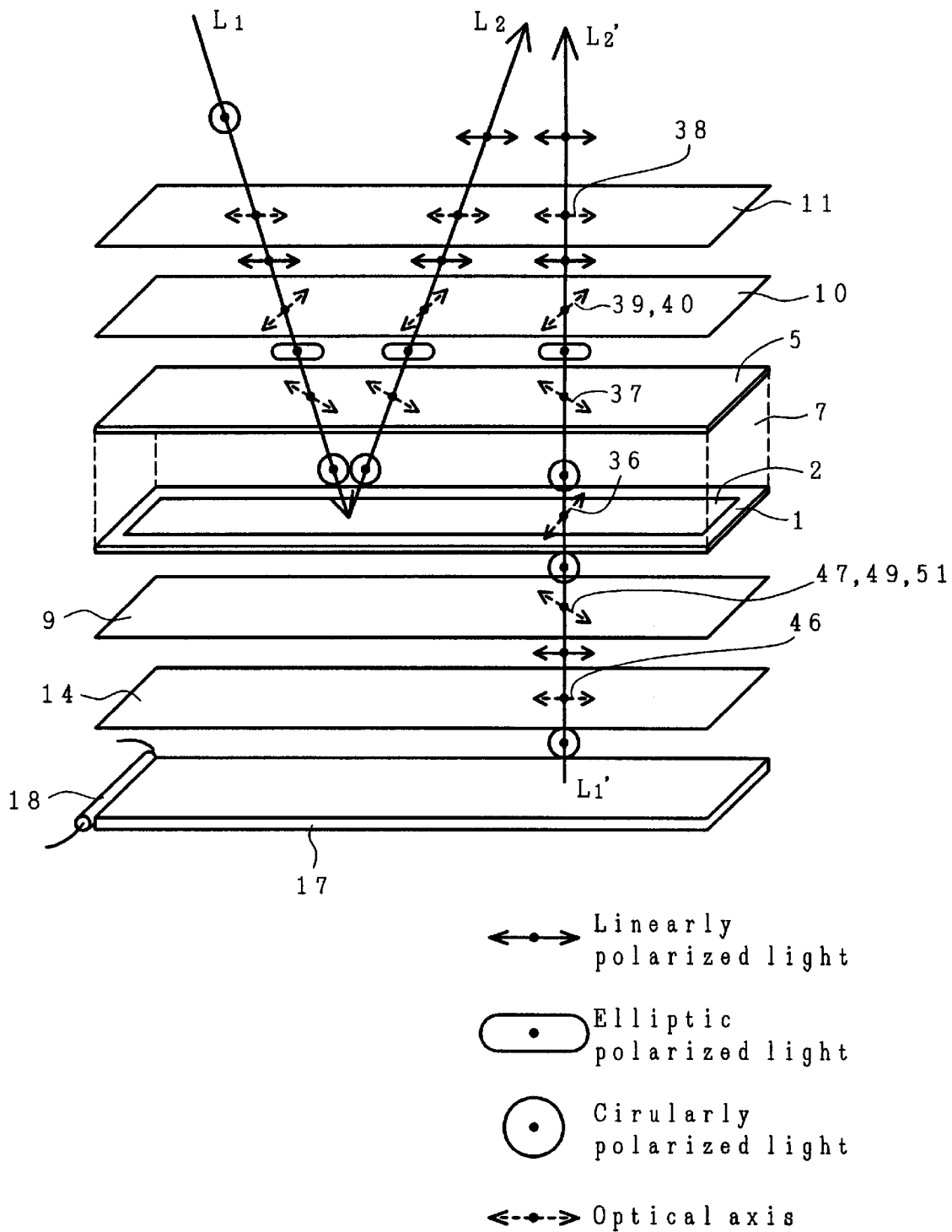
FIG. 8 is a perspective view of a liquid crystal panel showing the change of polarization of light in the reflection display mode and the transmission display mode according to one embodiment of the present invention.

FIG. 8 is a perspective view showing the change of polarization condition of the light in the reflection display mode and the transmission display mode in this embodiment.

L1 is a outdoor daytime light such as solar light, L2 indicates the reflected light reflected by the half reflecting layer 2, numeral 18 indicates a linear lamp (light source) and numeral 17 indicates a light guide plate which introduces the light from the light source 18 to the liquid crystal panel. The lighting device is comprised of the light source 18 and the light guide plate 17.

L1' is the light irradiated from the lighting device before passing through the half reflection layer 2 and L2' is the transmitted light which is obtained by making the light L1' irradiated from the lighting device pass through the half reflection layer 2.

Other symbols are as same as those of FIG. 1, FIG. 7(a) and FIG. 7(b).

First, the reflection display mode is explained. The outdoor daytime light L1 which is the light of a circular polarization is converted to the light of linear polarization when it passes through the upper polarization plate 11. At this point of time, the phases of respective wavelengths are leveled. Subsequently, when the outdoor daytime light of linear polarization passes through the upper retardation film 10, it is converted to the light of an elliptic polarization. At this point of time, the phases of respective wavelengths are different from each other. Thereafter, during its course of passing through the liquid crystal layer 7, the outdoor daytime light L1 of the elliptic polarization is converted to the light of the circular polarization and reaches the half reflection layer 2. At the point of time that the outdoor daytime light L1 reaches the half reflection layer 2, the phases of respective wavelengths are substantially leveled. This is because that the phases of respective wavelengths which are shifted during the outdoor daytime light L1 passes through the liquid crystal layer 7 are leveled by the upper retardation film 10.

Upon reaching the half reflecting layer 2, the outdoor daytime light L1 is reflected on the half reflecting layer 2 and turns out to be the reflected light L2. At the point of time of reflection on the half reflecting layer 2, the reflected light L2 is still the light of circular polarization. At the point of time of reflection on the half reflecting layer 2, the phases of respective wavelengths of the reflected light L2 are leveled, while the phase of the reflected light L2 is shifted 180° relative to the phase of the outdoor daytime light L1 right before being reflected by the half reflecting layer 2. Thereafter, the reflected light L2 is converted to the light of the elliptic polarization during its course of passing through the liquid crystal layer 7 and is emitted from the upper substrate 5. At this point of time, the phases of respective wavelengths are different from each other again. Subsequently, when the reflected light L2 of elliptic polarization passes through the upper retardation film 10, it is converted to the light of the linear polarization. At this point of time, the phases of respective wavelengths are leveled by the upper retardation film 10 so that they substantially agree with each other. The reflected light L2 having now the linear polarization passes through the upper polarizing plate 11 and is diffused by the light diffusing plate 15 not shown in the drawing and reaches eyes of an observer. Accordingly, at the point of time of reaching the eyes of the observer, the phases of the respective wavelengths of the reflected light L2 are leveled, the display is not tinted in colors of specific wavelengths and hence, the display is observed as a display of natural colors by the observer.

Furthermore, in an optical system of the reflection display mode, the retardations Δn·d and the optical axes of the upper polarizing plate 11, the upper retardation film 10 and the liquid crystal layer 7 are determined such that the outdoor daytime light L1 at the point of time of being reflected by the half reflecting layer 2 has the circular polarization condition. By making the outdoor daytime light L1 at the point of time of being reflected by the half reflecting layer 2 have the circular polarization condition, the reflected light L2 also becomes the circular polarization so that the reflectance is enhanced and the wavelength dependency of the reflectance is minimized and there is no fear of tinting in specific colors.

Subsequently, the transmission display mode is explained.

The illumination light L1' irradiated from the lighting device has the phases of respective wavelengths thereof which are not leveled and hence, it is the light having irregular phases. The illumination light L1' irradiated from the lighting device is the light having the circular polarization and it is directly converted to the light having the linear polarization when it passes through the lower polarizing plate 14. The illumination light L1' converted to the light having the linear polarization is converted to the light having the circular polarization upon passing through the lower retardation film 9. That is, according to the present invention, the illumination light L1' at the point of time of reaching the half reflecting layer 2 becomes the light having the circular polarization as in the case of the reflecting light L1. The stretching axis and the retardation Δn·d of the lower polarizing plate 14 are determined such that the illumination light L1' at this point of time becomes the light which has the phases of respective wavelengths leveled. Accordingly, the transmitted light L2' which has passed through the half reflecting layer 2 follows the same path as the reflected light L2 so that by making the transmitted light L2' which has passed through the half reflecting layer 2 have the same polarization condition and the phase condition as the reflected light L2, no difference of display takes place between the transmission display mode and the reflection display mode. In case the phase difference between the transmitted light L2' and the reflected light L2 is within ±π/4, no substantial difference is observed in displayed colors between the transmission display mode and the reflection display mode.

The illumination light L1' at the point of time of reaching the half reflecting layer 2 is the light of the circular polarization which has the leveled polarization plane and is different from the light of the circular polarization just after being irradiated from the lighting device which has irregular polarization plane. The reflected light L1 at the point of time of reaching the half reflecting layer 2 also turns out to be the light of the circular polarization which has the leveled polarization plane. Accordingly, when the light of the lighting device is directly irradiated to the half reflecting layer 2, the display different from the reflection display mode can be obtained.

Although the lower retardation film 9 is made of a single sheet of film in the previously mentioned embodiment, the lower retardation film 9 may be made of two overlapped retardation films.

In case the lower retardation film 9 is made of two retardation films, as shown in FIG. 7(b) in a dotted line, in place of the stretching axis 47 of the lower retardation film 9, a stretching axis of the first lower retardation film 9 which comes into contact with the lower substrate is denoted as 51, and a stretching axis of the second lower retardation film 9 which comes into contact with the lower polarization plate 14 is denoted as 49, and an angle 52 made by the stretching axis 51 of the first lower retardation film 9 and the line e—e is preferably set to 100±10° and an angle 50 made by the stretching axis 49 of the second lower retardation film 9 and the line e—e is preferably set to 162.5±10°. The other conditions are as same as those of the previously mentioned embodiment.

According to the embodiment of the present invention, both the reflection display mode and the transmission display mode can enhance the brightness and can obtain the image display having the high contrast.

Figure 2:
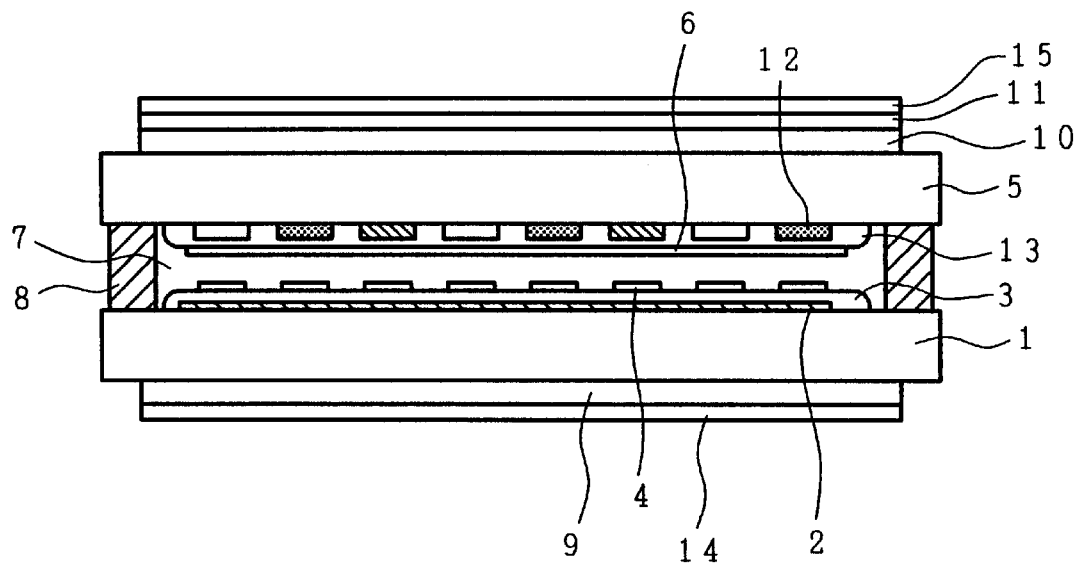
FIG. 2 is a cross sectional view explaining the second embodiment of the liquid crystal panel according to the present invention.

FIG. 2 is a cross sectional view explaining the second embodiment of the liquid crystal panel according to the present invention, wherein the same numerals which also appear in FIG. 1 denote the same parts and numeral 12 indicates a color filter made of three colors (R, G, B).

Between respective colors R, G, B which constitute the color filter 12, a grid-like light blocking film (black matrix) may be formed if necessary, and a passivation film 13 preferably made of a transparent organic material is formed on the color filter 12. This passivation film 13 prevents the liquid crystal layer 7 from being contaminated by the color filter 12 and also makes the surface of the electrode flattened and smooth. Other remaining constructions and functions of this embodiment are as same as those of the first embodiment.

According to this embodiment, both the reflection display mode and the transmission display mode can enhance the brightness and can obtain the color image display of high contrast, no color mixing and high chroma.

Figure 3:
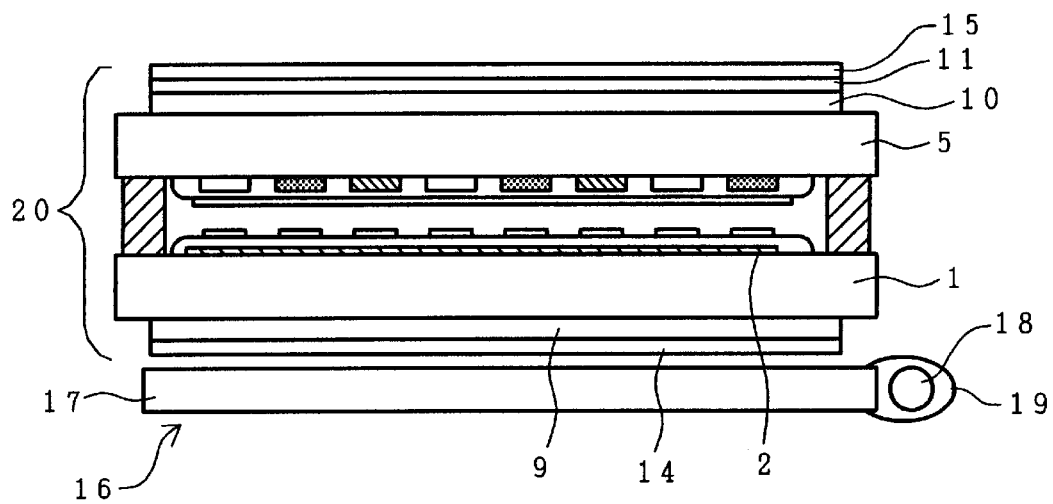
FIG. 3 is a cross sectional view explaining the construction of the first embodiment of the liquid crystal display device according to the present invention.

FIG. 3 is a cross sectional view explaining the construction of the first embodiment of the liquid crystal display device according to the present invention, wherein a case that the liquid crystal display device uses the liquid crystal panel explained previously in view of FIG. 2 is shown. In the drawing, numeral 20 indicates half reflection type liquid crystal panel and a backlight 16 is disposed on a planar surface of the liquid crystal panel 20 so as to construct the liquid crystal display device.

The backlight 16 is comprised of a light guide plate 17 which is made of a transparent acrylic plate provided with a surface treatment for giving the light directivity to the plate, a linear lamp 18 such as a cold cathode fluorescent tube arranged along one side of the light guide plate 17, and a reflection sheet 19.

According to this liquid crystal display device, in an environment which has a sufficient outdoor daytime light, the backlight 16 is turned off and the display of the image is performed in the reflection mode which uses the outdoor daytime light which enters from the upper glass substrate 5 side as the illumination light. On the other hand, in a condition where there is a little or no outdoor daytime light, the backlight 16 is turned on so as to perform the image display in the transmission mode.

Here, in case the outdoor daytime light is insufficient, when the backlight 16 is turned on, the degree of polarization and the polarization angle of respective retardation films and respective polarizing plates and Δn·d of respective constitutional members are determined such that the phase of the light which has passed through the half reflection layer 2 from the backlight 6 and the phase of the outdoor daytime light which is reflected by the half reflecting layer 2 substantially agree with each other thus providing high brightness and high contrast.

According to the liquid crystal display device of the present embodiment, the half reflection type liquid crystal display device which enables the image display of high brightness and high contrast can be obtained.

Figure 4:
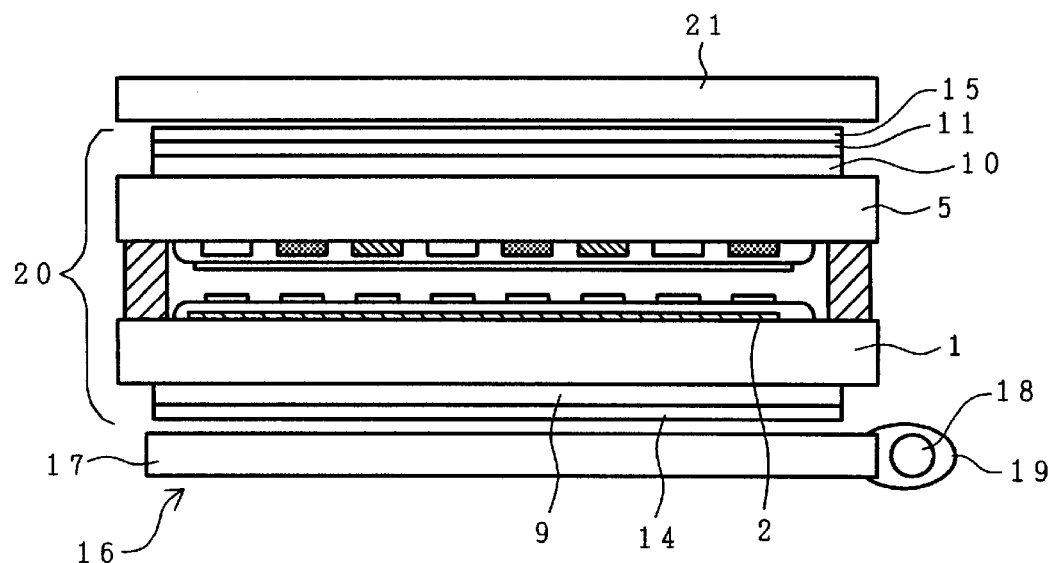
FIG. 4 is a cross sectional view explaining the construction of the second embodiment of the liquid crystal display device according to the present invention.

FIG. 4 is a cross sectional view showing the construction of the second embodiment of the liquid crystal display device according to the present invention. This drawing shows the liquid crystal display device equipped with the liquid crystal panel explained previously in view of FIG. 2. In this embodiment, a touch panel 21 is mounted on the display surface side of the liquid crystal display device as shown in FIG. 3.

This touch panel 21 has a function to directly input information by tracing the surface of the screen with a nib or the like and inputted data is displayed on the liquid crystal panel 20 or is stored in memory means not shown in the drawing and is utilized.

According to the liquid crystal display device of the present embodiment, the half reflection type liquid crystal display device which enables the direct screen inputting and the image display of high brightness and high contrast can be obtained.

Figure 5:
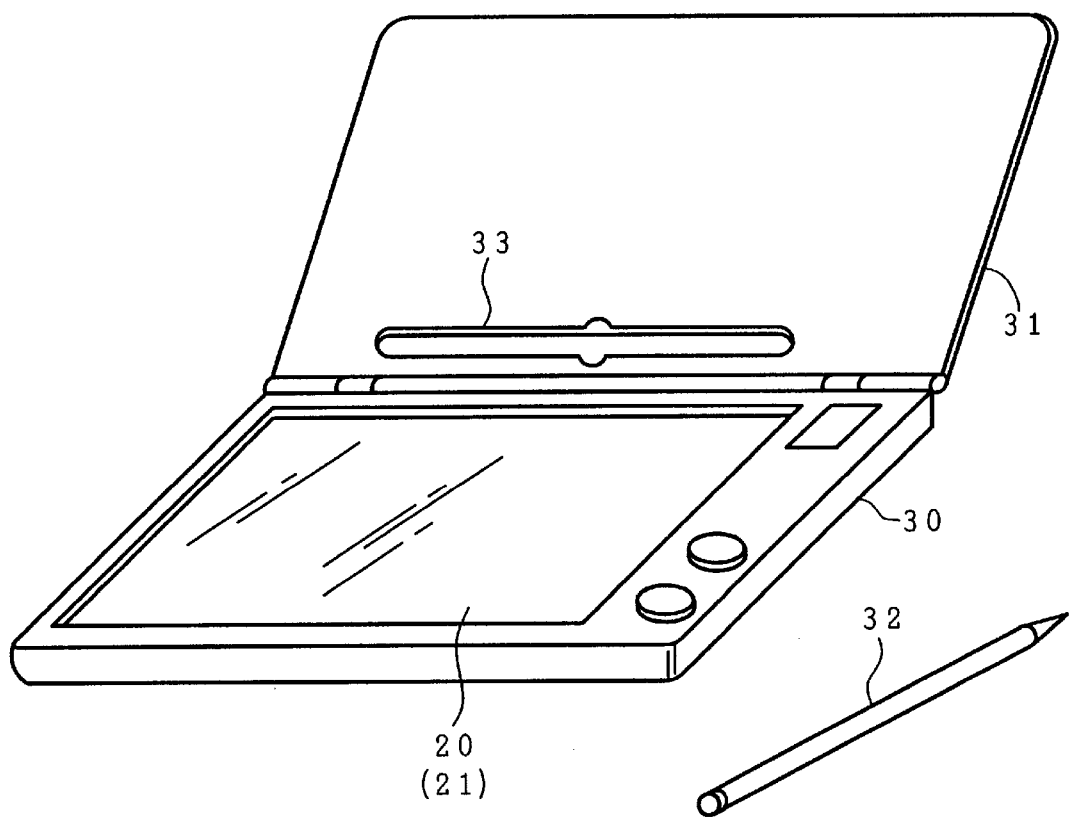
FIG. 5 is a perspective view showing one example of construction of a portable information terminal as an example of an electronic equipment on which the liquid crystal display device according to the present invention is mounted.
Figure 6:
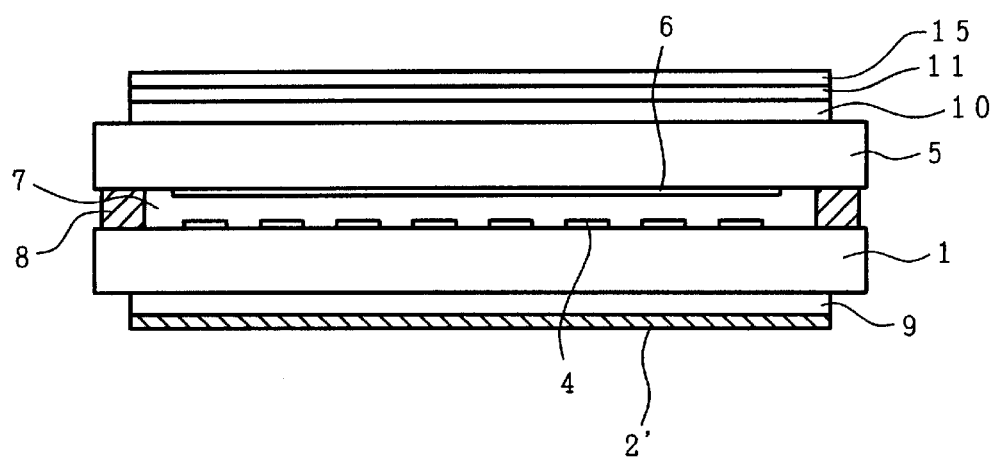
FIG. 6 is a cross sectional view showing the schematic construction of the conventional half reflection type liquid crystal panel.

FIG. 5 is a perspective view explaining an example of the construction of the portable type information terminal as an example of an electronic equipment on which the liquid crystal display device of the present invention is mounted. This portable type information terminal (PDA) is comprised of a body portion 30 and a cover 31 which is mounted on the body portion 30 by means of a hinge such that it can be opened or closed and the liquid crystal display device according to the present invention is mounted on the body portion 30.

This liquid crystal panel 20 of the liquid crystal display device is of the above-mentioned half reflection type and can provide a favorable image recognition in both the reflection mode and the transmission mode and can obtain the image display of high brightness, high contrast and no color mixing irrespective of the presence of the environmental outdoor daytime light. Furthermore, in case the touch panel 21 is mounted on the upper surface of the liquid crystal panel 20, letters and symbols can be inputted by tracing the input portion on the display screen with a pen 32 accommodated in an accommodating portion 33 formed on a portion of the cover 31.

The shape and the structure of this kind of portable type information terminal are not limited to those shown in the drawing and the terminal can have other various shapes, constructions and functions.

Furthermore, the present invention is not limited to the liquid crystal display device equipped with the above-mentioned touch panel and is applicable to the liquid crystal display device having no backlight or other general reflection-type liquid crystal display device in the same manner. as has been described heretofore, according to the present invention, it becomes possible to provide the half reflection type liquid crystal panel capable of performing the image display of high brightness and high contrast and the liquid crystal display device equipped with this liquid crystal panel.

What is claimed is:

1. A liquid crystal panel in which a liquid crystal layer is sandwiched between an upper substrate which is provided with upper transparent electrodes for forming pixels, and a lower substrate, which is provided with lower transparent electrodes disposed so as to intersect with said upper transparent electrodes, said liquid crystal panel comprising: a half reflection layer having a reflection function and a transmission function which is formed on the inner surface of said lower substrate as a lower layer of said lower transparent electrodes; an upper retardation film, an upper polarizing plate and a light diffusing plate, which are laminated on said upper substrate; and a lower retardation film and a lower polarizing plate, which are laminated on the surface of said lower substrate; and wherein the phase of said reflected light at said half reflecting layer and the phase of a transmitted light which passes through said half reflection layer from said lower substrate substantially agree with each other.

2. A liquid crystal display device according to claim 1, wherein the transmission factor of said half reflection layer is made uniform within a display range of said liquid crystal panel.

3. A liquid crystal display device according to claim 1, wherein a back lighting device is disposed at the back side of said liquid crystal panel.

4. A liquid crystal display device according to claim 3, wherein a touch panel is disposed at the front surface side of said liquid crystal panel.

5. A liquid crystal panel in which a liquid crystal layer is sandwiched between an upper substrate, which is provided with upper transparent electrodes for forming pixels and a lower substrate, which is provided with lower transparent electrodes disposed so as to intersect with said upper transparent electrodes, said liquid crystal panel comprising: a half reflection layer having a reflection function and a transmission function which is formed on the inner surface of said lower substrate as a lower layer of said lower transparent electrodes; an upper retardation film, an upper polarizing plate and a light diffusing plate, which are laminated on said upper substrate; and a lower retardation film and a lower polarizing plate, which are laminated on the surface of said lower substrate; said liquid crystal panel further including a color filter layer of a plurality of colors which is formed on the inner surface of said upper substrate as a lower layer of said upper transparent electrodes, and a passivation film formed between said color filter layer and said upper transparent electrodes, and the retardation Δnd of said lower retardation film being determined such that the phase of transmitted light which passes through said lower polarizing plate, said lower retardation film and said half reflection layer becomes equivalent to the phase of reflected light by said half reflection layer.

6. A liquid crystal display device according to claim 5, wherein the transmission factor of said half reflection layer is made uniform within a display range of said liquid crystal panel.

7. A liquid crystal display device according to claim 5, wherein a back lighting device is disposed at the back side of said liquid crystal panel.

8. A liquid crystal display device according to claim 7, wherein a touch panel is disposed at the front surface side of said liquid crystal panel.

9. A liquid crystal panel in which a liquid crystal layer is sandwiched between an upper substrate, which is provided with upper transparent electrodes for forming pixels, and a lower substrate, which is provided with lower transparent electrodes disposed so as to intersect with said upper transparent electrodes, said liquid crystal panel comprising; a half reflection layer having a reflection function and a transmission function which is formed on the inner surface of said lower substrate as a lower layer of said lower transparent electrodes; an upper retardation film, an upper polarizing plate and a light diffusing plate which are laminated on said upper substrate; and a lower retardation film and a lower polarizing plate, which are laminated on the surface, of said lower substrate, said liquid crystal panel further including a color filter layer of a plurality of colors which is formed on the inner surface of said upper substrate as a lower layer of said upper transparent electrodes, and a passivation layer formed between said color filter layer and said upper transparent electrodes, and wherein the phase difference between the phase of a transmitted light which passes through said lower polarizing plate, said lower retardation film and said half reflection layer and the phase of a reflected light at said half reflection layer is set within $\pm\pi/4$.

10. A liquid crystal display device according to claim 9, wherein the transmission factor of said half reflection layer is made uniform within a display range of said liquid crystal panel.

11. A liquid crystal display device according to claim 9, wherein a back lighting device is disposed at the back side of said liquid crystal panel.

12. A liquid crystal display device according to claim 11, wherein a touch panel is disposed at the front surface side of said liquid crystal panel.

* * * * *